(12) United States Patent
Yang et al.

(10) Patent No.: US 12,001,127 B2
(45) Date of Patent: Jun. 4, 2024

(54) OPTICAL DEVICE AND PROJECTOR

(71) Applicant: CRE ELECTRONIC TECHNOLOGY CO., LIMITED, Changsha (CN)

(72) Inventors: Xiucai Yang, Changsha (CN); Lejun Ren, Changsha (CN)

(73) Assignee: CRE ELECTRONIC TECHNOLOGY CO., LIMITED, Changsha (CN)

(*) Notice: Subject to any disclaimer, the term of this patent is extended or adjusted under 35 U.S.C. 154(b) by 20 days.

(21) Appl. No.: 17/900,980

(22) Filed: Sep. 1, 2022

(65) Prior Publication Data

US 2024/0053665 A1  Feb. 15, 2024

(30) Foreign Application Priority Data

Aug. 12, 2022 (CN) .......................... 202210967549.2

(51) Int. Cl.
*G03B 21/14* (2006.01)
*G03B 21/16* (2006.01)
*G03B 21/20* (2006.01)
*G03B 21/28* (2006.01)
*G03B 21/00* (2006.01)

(52) U.S. Cl.
CPC ........... *G03B 21/145* (2013.01); *G03B 21/16* (2013.01); *G03B 21/2066* (2013.01); *G03B 21/28* (2013.01); *G03B 21/006* (2013.01)

(58) Field of Classification Search
CPC ...... G03B 21/16; G03B 21/28; G03B 21/145; G03B 21/2066
See application file for complete search history.

(56) References Cited

U.S. PATENT DOCUMENTS

| 5,642,927 A * | 7/1997 | Booth ............... G03B 21/30 |
| | | 353/101 |
| 10,509,306 B1 * | 12/2019 | Chen .............. G03B 21/2033 |
| 10,809,603 B1 * | 10/2020 | Xu ................. G03B 21/2033 |
| 11,194,237 B2 * | 12/2021 | Xu ................. G03B 21/2073 |
| 11,513,430 B2 * | 11/2022 | Guo ............... G03B 21/2033 |
| 2020/0096848 A1 * | 3/2020 | Xu .................... G02B 27/286 |
| 2021/0240060 A1 * | 8/2021 | Guo .................. G03B 21/006 |
| 2023/0121040 A1 * | 4/2023 | Gontarz ............... G03B 17/54 |
| | | 353/15 |

* cited by examiner

*Primary Examiner* — Bao-Luan Q Le
(74) *Attorney, Agent, or Firm* — Daniel M. Cohn; Howard M. Cohn

(57) ABSTRACT

An optical device with a secondary reflecting structure includes a housing that is sealed. A light source, a first reflecting mirror, a lens module, a second reflecting mirror, and a projection lens are arranged in the housing. The first reflecting mirror is adjacent to the light source. The second reflecting mirror is arranged above the first reflecting mirror. The projection lens is adjacent to the second reflecting mirror and is arranged above the light source. The lens module is arranged between the first reflecting mirror and the second reflecting mirror. Light emitted by the light source is reflected by the first reflecting mirror and passes through the lens module to reach the second reflecting mirror, then the light is reflected to the projection lens through the second reflecting mirror. A projector includes a casing and the optical device with the secondary reflecting structure arranged in the casing.

8 Claims, 7 Drawing Sheets

OPTICAL DEVICE AND PROJECTOR

TECHNICAL FIELD

The present disclosure relates to a technical field of projectors, and in particular to an optical device with a secondary reflecting structure and a projector.

BACKGROUND

With popularization of electronic devices, projectors have gradually come to attention of public. The projectors have advantages of large display area and convenient placement. The projectors are mostly used in conferences, teaching, exhibitions, and other occasions, and the projectors are gradually coming into more and more families. More and more people use the projectors to replace TVs as home audio and video equipment. However, a conventional projector has following shortcomings:
1. A size of the conventional projector is generally too large to carry.
2. An internal structure of the conventional projector is relatively scattered and a space utilization rate of the conventional projector is not high.
3. Under a premise of limited volume, heat dissipation effect of internal components of the conventional projector is not good.
4. There is no heat dissipating structure arranged for components arranged on a mainboard of the conventional projector, which causes the mainboard to overheat after long-term operation.

SUMMARY

In view of defects of a conventional projector in the prior art, the present disclosure provides a projector to overcome the defects in the prior art.

To achieve the above object, the present disclosure provides an optical device with a secondary reflecting structure.

The optical device with the secondary reflecting structure comprises a housing. The housing is sealed. A light source, a first reflecting mirror, a lens module, a second reflecting mirror, and a projection lens are arranged in the housing. The first reflecting mirror is adjacent to one side of the light source. The second reflecting mirror is arranged above the first reflecting mirror. The projection lens is adjacent to one side of the second reflecting mirror and is arranged above the light source. The lens module is arranged between the first reflecting mirror and the second reflecting mirror. Light emitted by the light source is reflected by the first reflecting mirror and passes through the lens module to reach the second reflecting mirror, then the light is reflected to the projection lens through the second reflecting mirror.

In one embodiment, an angle between the light emitted by the light source and a reflective surface of the first reflecting mirror is 45 degrees. An angle between the first reflecting mirror and the second reflecting mirror is 90 degrees. The lens module and the projection lens are horizontally arranged.

In one embodiment, a condenser lens is arranged between the light source and the first reflecting mirror. The lens module comprises a first lens, a reflective polarizer, a liquid crystal screen, and a second lens. The first lens, the reflective polarizer, the liquid crystal screen, and the second lens are sequentially arranged from bottom to top and are arranged parallel to each other.

In one embodiment, the housing comprises at least two shells. The at least two shells are connected by buckles. An interior of the housing defines a first cavity, a lens module mounting cavity, an image display module mounting cavity, and second cavity sequentially provided from top to bottom.

The second reflecting mirror is arranged on a left end of the first cavity. A right end of the first cavity defines a lens mounting opening. The projection lens is connected to the lens mounting opening to seal the lens mounting opening.

The second lens and the liquid crystal screen are arranged inside the lens module mounting cavity.

The reflective polarizer and the first lens are arranged inside the image display module mounting cavity.

A cooling fan, the first reflecting mirror, the condenser lens, and the light source are sequentially arranged inside the second cavity from left to right. A radiator is arranged on a position of an outer side wall of the housing corresponding to the light source. A left end of the second cavity defines a first opening. A right end of the lens module mounting cavity and a right end of the image display module mounting cavity separately define a second opening. A left end of the lens module mounting cavity defines a third opening. A first heat dissipating plate is connected to the first opening and the third opening to seal the first opening and the third opening. A second heat dissipating plate is connected to the second opening of the lens module mounting cavity and the second opening of the image display module mounting cavity to seal the second opening of the lens module mounting cavity and the second opening of the image display module mounting cavity.

An air outlet of the cooling fan is communicated with a left end of the image display module mounting cavity. A speaker box is arranged on a position of the outer side wall of the housing corresponding to the second reflecting mirror. A mainboard is arranged above the speaker box.

In one embodiment, a top portion of the speaker box defines a sound cavity air pipe outlet. The mainboard is arranged above the sound cavity air pipe outlet. A central processing unit (CPU) is arranged on a position of the mainboard corresponding to the sound cavity air pipe outlet.

In one embodiment, a longitudinal section of the first heat dissipating plate is in a shape of "[". A right side of the first heat dissipating plate is recessed inward to form a groove. A right end of the first heat dissipating plate is connected with the first opening of the housing.

Ribs are arranged at intervals on an outer surface of a front side wall of the first heat dissipating plate, an outer surface of a rear side wall of the first heat dissipating plate, an outer surface of an upper side wall of the first heat dissipating plate, an outer surface of a lower side wall of the first heat dissipating plate, an outer surface of the left side wall of the first heat dissipating plate, an inner surface of the left side wall of the first heat dissipating plate, and an inner surface of the lower side wall of the first heat dissipating plate.

In one embodiment, the ribs on the outer surface of the front side wall of the first heat dissipating plate, the ribs on the outer surface of the rear side wall of the first heat dissipating plate, and the ribs on the outer surface of the left side wall of the first heat dissipating plate are horizontally arranged. The ribs on the outer surface of the upper side wall of the first heat dissipating plate and the ribs on the outer surface of the lower side wall of the first heat dissipating plate are arranged perpendicular to the ribs on the outer surface of the left side wall of the first heat dissipating plate. The ribs on the inner surface of the left side wall of the first heat dissipating plate and the ribs on the inner surface of the lower side wall of the first heat dissipating plate are vertically arranged.

The ribs on the outer surface of the front side wall of the first heat dissipating plate, the ribs on the outer surface of the rear side wall of the first heat dissipating plate, and the ribs on the outer surface of the left side wall of the first heat dissipating plate are arranged in a one-to-one correspondence. The ribs on the outer surface of the left side wall of the first heat dissipating plate connect the ribs on the outer surface of the front side wall of the first heat dissipating plate and the ribs on the outer surface of the rear side wall of the first heat dissipating plate. The ribs on the inner surface of the left side wall of the first heat dissipating plate are arranged one-to-one corresponding to the ribs on the inner surface of the lower side wall of the first heat dissipating plate. The ribs on the inner surface of the left side wall of the first heat dissipating plate are one-to-one connected to the ribs on the inner surface of the lower side wall of the first heat dissipating plate. A distance between each two adjacent ribs of the ribs on the outer surface of the upper side wall of the first heat dissipating plate is equal to a distance between each two adjacent ribs of the ribs on the outer surface of the lower side wall of the first heat dissipating plate.

In one embodiment, the radiator comprises a substrate, a radiator fan, four radiating pipes, and a plurality of cooling fins. The plurality of cooling fins is arranged side by side and is arranged at intervals. The substrate is arranged on the position of the outer side wall of the housing corresponding to the light source. The radiator fan is stacked on the plurality of cooling fins. The radiator fan is arranged on outer sides or inner sides of the plurality of cooling fins. A first end of each of the radiating pipes passes through the plurality of cooling fins. A second end of each of the radiating pipes is connected to the substrate.

Four through holes are on each of the cooling fins from top to bottom. The first end of each of the radiating pipes passes through a corresponding through hole of each of the cooling fins.

In one embodiment, a first radiating pipe of each two adjacent radiating pipes of the radiating pipes passes through a corresponding through hole of each of the cooling fins from front to rear. A second radiating pipe of each two adjacent radiating pipes of the radiating pipes passes through a corresponding through hole of each of the cooling fins from rear to front.

The present disclosure further provides a projector. The projector comprises a casing and the optical device with the secondary reflecting structure mentioned above. The optical device with the secondary reflecting structure is arranged in the casing.

Compared with the prior art, the optical device with the secondary reflecting structure and the projector of the present disclosure comprise the housing that is sealed. The light source, the first reflecting mirror, the lens module, the second reflecting mirror, and the projection lens are arranged in the housing. The first reflecting mirror is adjacent to one side of the light source. The second reflecting mirror is arranged above the first reflecting mirror. The projection lens is adjacent to one side of the second reflecting mirror and is arranged above the light source. The lens module is arranged between the first reflecting mirror and the second reflecting mirror. The light emitted by the light source is reflected by the first reflecting mirror and passes through the lens module to reach the second reflecting mirror, then the light is reflected to the projection lens through the second reflecting mirror. Compared with the conventional projector, the projector of the present disclosure is smaller in size and can make more full use of an interior space of the projector, which reduces packaging, transportation, and storage costs.

Further, a circulating heat dissipating channel is formed by the cooling fan, gaps between lenses of an image display module, the second heat dissipating plate, gaps between lenses of the lens module, and the first heat dissipating plate. Moreover, the radiator is arranged outside the light source, so that heat generated inside the optical device is dissipated in time to a maximum extent, which ensures a long-term and stable operation of the optical device.

Furthermore, by defining the sound cavity air pipe outlet on the speaker box and by arranging the mainboard above the speaker box, the CPU on the mainboard directly faces the sound cavity air pipe outlet. When in use, airflow generated by the speaker box that discharged from the sound cavity air pipe outlet is targeted to dissipate heat generated by the CPU arranged on the mainboard.

Moreover, by improving a structure of the first heat dissipating plate, five sides of the first heat dissipating plate are in contact with the circulating heat dissipating channel inside the optical device, thereby increasing a contact area between the first heat dissipating plate and the heat generated inside the optical device. Correspondingly, the first heat dissipating plate quickly dissipates the heat generated inside the optical device to achieve effect of rapid cooling.

In addition, by symmetrically arranging the four radiating pipes on sides of the cooling fins, channels for the heat generated by the light source to flow to the cooling fins are increased, thereby enhancing heat dissipation effect of the light source.

DETAILED DESCRIPTION

Figure 1:
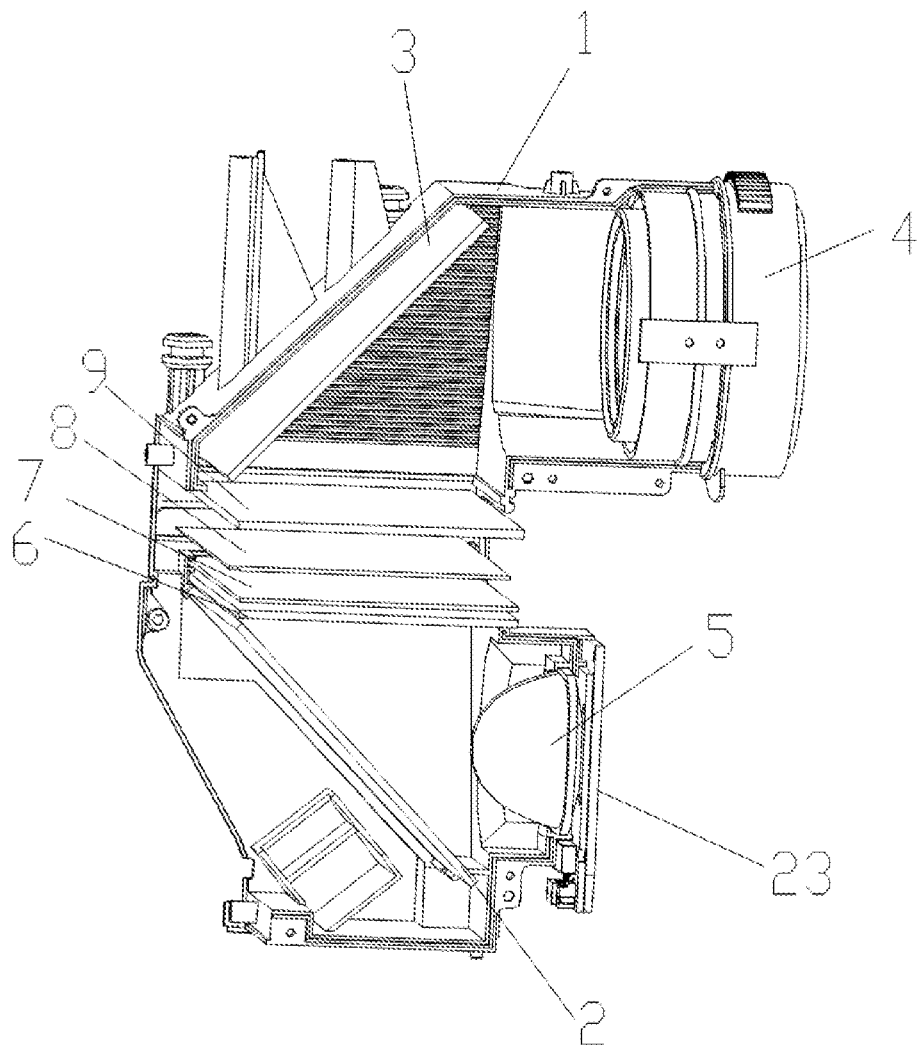
FIG. 1 is a schematic diagram of an optical device with a secondary reflecting structure of the present disclosure.

It should be understood that in the description of the present disclosure terms such as "central", "vertical", "landscape", "upper", "lower", "left", "right", "vertical", "horizontal", "top", "bottom", "inner", "outer", "axial", "radial", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure.

In addition, terms such as "first" and "second" are only used for the purpose of description, rather than being understood to indicate or imply relative importance or hint the number of indicated technical features. Thus, the feature limited by "first" and "second" can explicitly or impliedly include one or more features. In the description of the present disclosure, the meaning of "a plurality of" is two or more unless otherwise specified.

It should be noted in the description of the present disclosure that, unless otherwise regulated and defined, terms such as "installation", "bonded", and "connection" shall be understood in broad sense, and for example, may refer to fixed connection or detachable connection or integral connection, may refer to mechanical connection or electrical connection, and may refer to direct connection or indirect connection through an intermediate medium or inner communication of two elements. For those of ordinary skill in the art, the meanings of the above terms in the present disclosure may be understood according to concrete conditions.

In the present disclosure, unless expressly stipulated and defined otherwise, the first feature is arranged "above" or "below" the second feature may meas that the first feature directly contact the second feature, or the first feature does not directly contact the second feature but connected with the second feature through other features between them. Furthermore, the first feature is arranged "on", "above" or "over" the second feature means that the first feature may arrange directly above and obliquely above the second feature, or it may merely indicate that a level of the first feature is greater than a level of the second feature. The first feature is arranged "below", "under", and "beneath" the second feature means that the first feature is arranged directly below and obliquely below the second feature, or it simply means that the level of the first feature is less than the level of second feature.

In the description of the specification, reference terms such as "one embodiment", "some embodiments", "example", "specific example", or "some examples", etc., mean specific features, examples, structures, materials, or characteristics described in connection with the embodiment are included in at least one embodiment or example of the present disclosure. In the specification, schematic representations of above terms are not necessarily directed to the same embodiment or example. Further, the specific features, the structures, the materials, or the characteristics described may be combined in any suitable manner in any one or more embodiments or examples. Furthermore, without conflicting each other those skilled in the art may combine the features of the different embodiments or the examples described in the specification.

Figure 2:
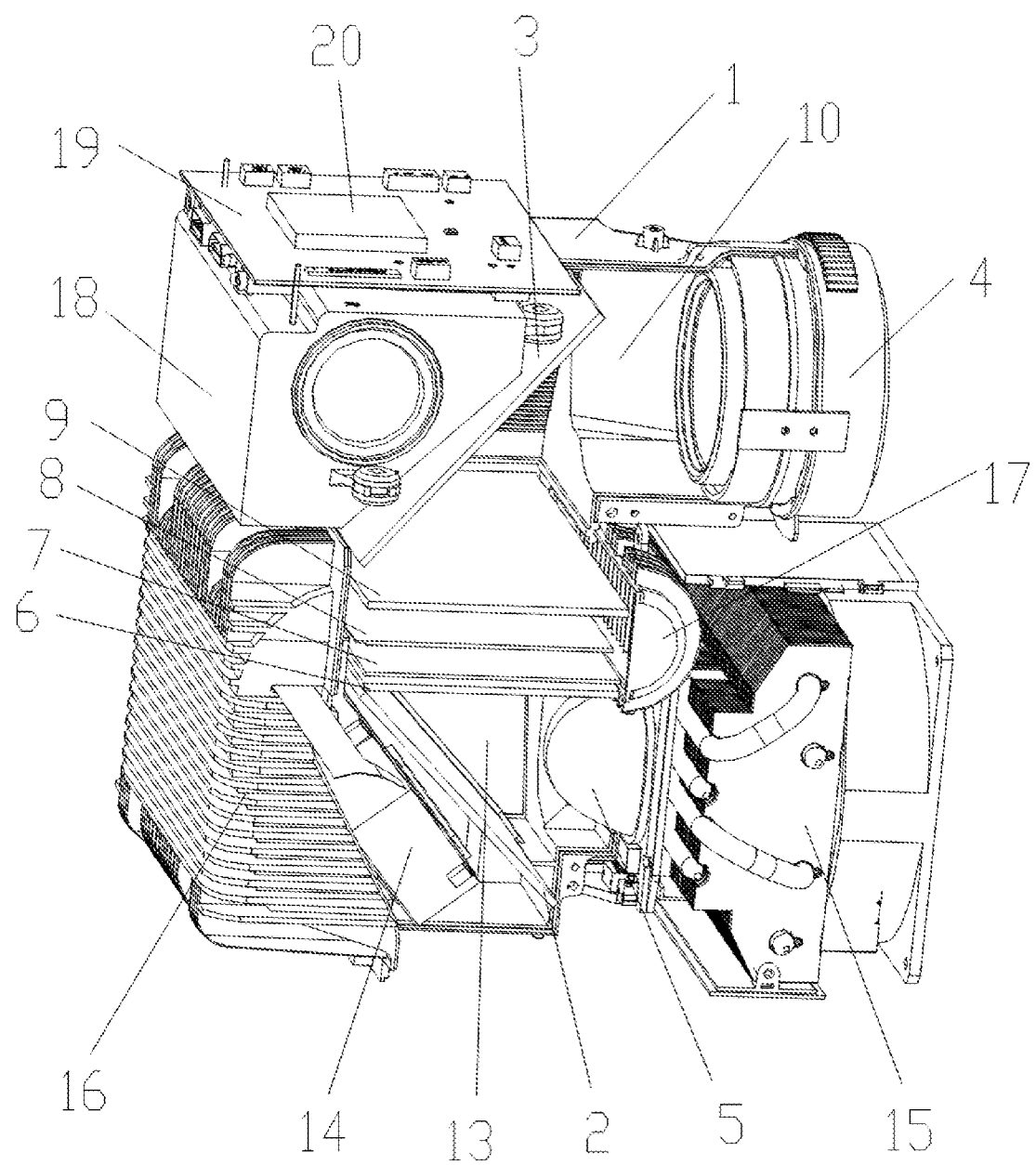
FIG. 2 is a perspective schematic diagram of the optical device of the present disclosure.
Figure 3:
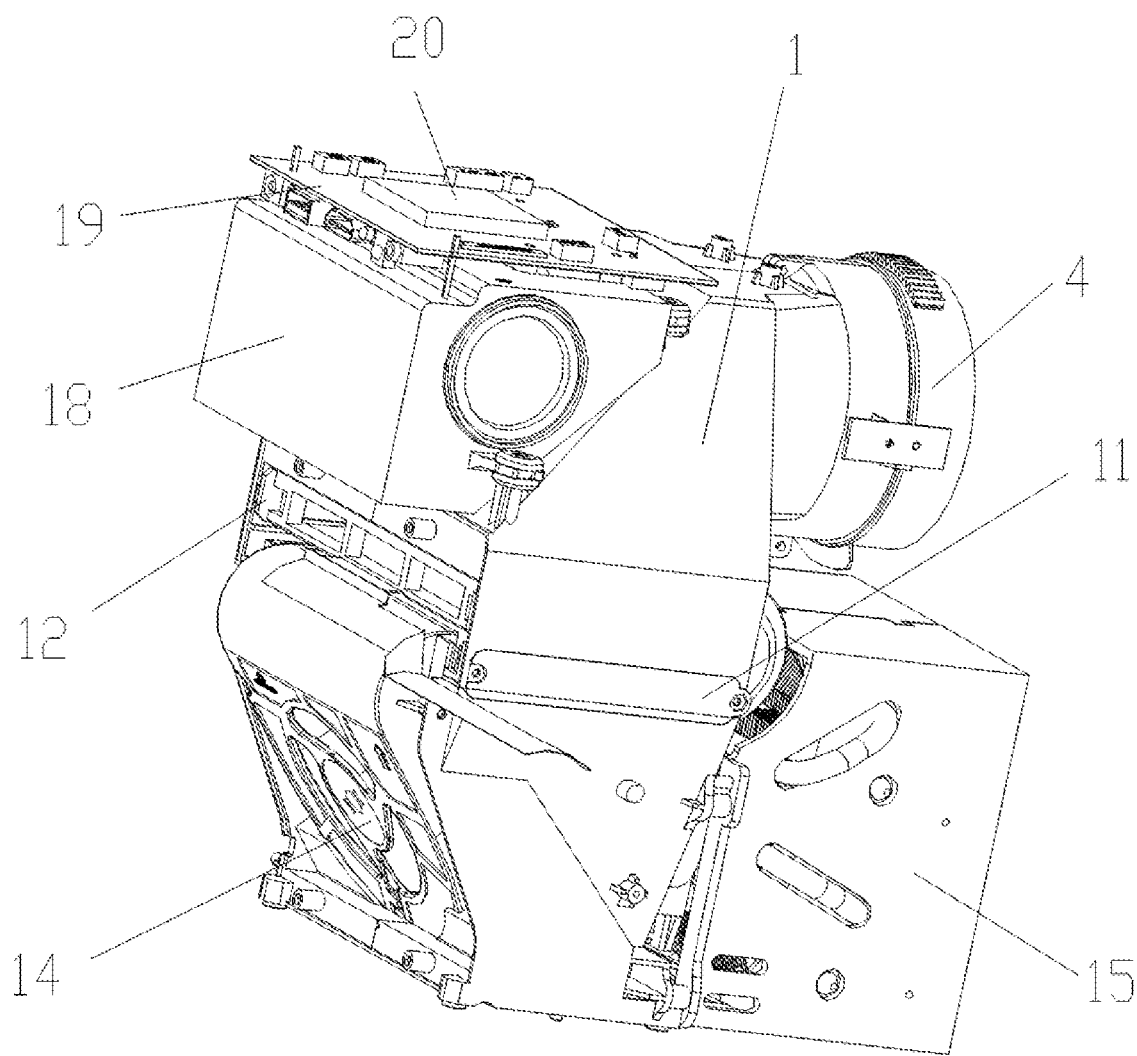
FIG. 3 is another perspective schematic diagram of the optical device of the present disclosure.
Figure 4:
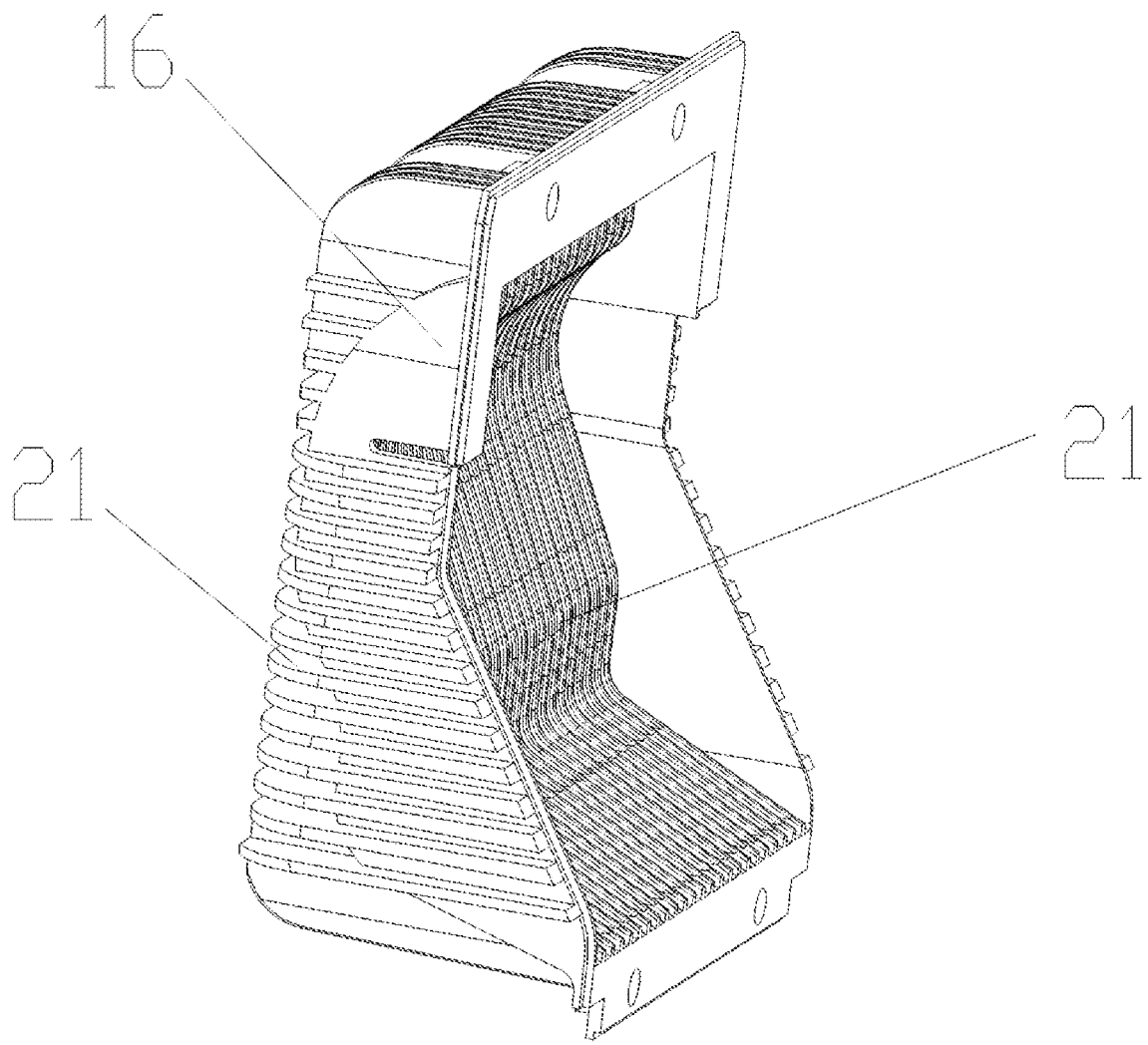
FIG. 4 is a perspective schematic diagram of a first dissipating plate of the optical device of the present disclosure.
Figure 5:
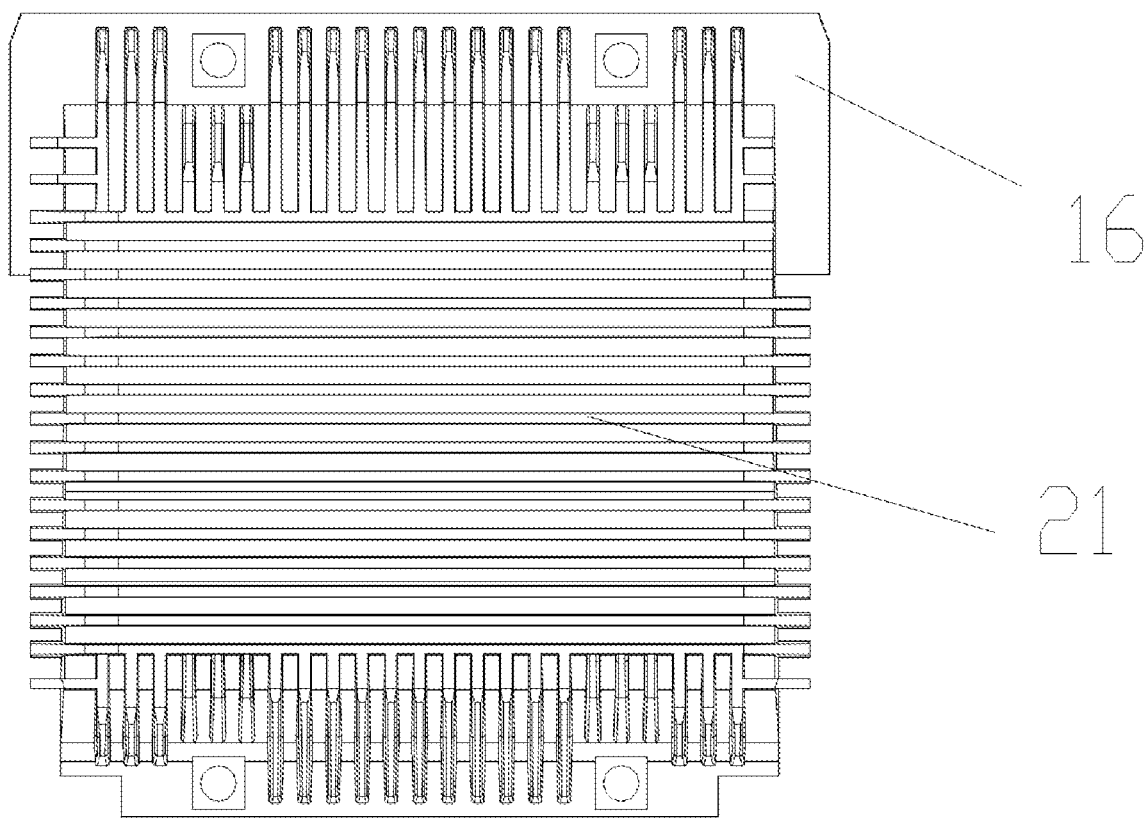
FIG. 5 is a left side schematic diagram of the first dissipating plate of the optical device of the present disclosure.
Figure 6:
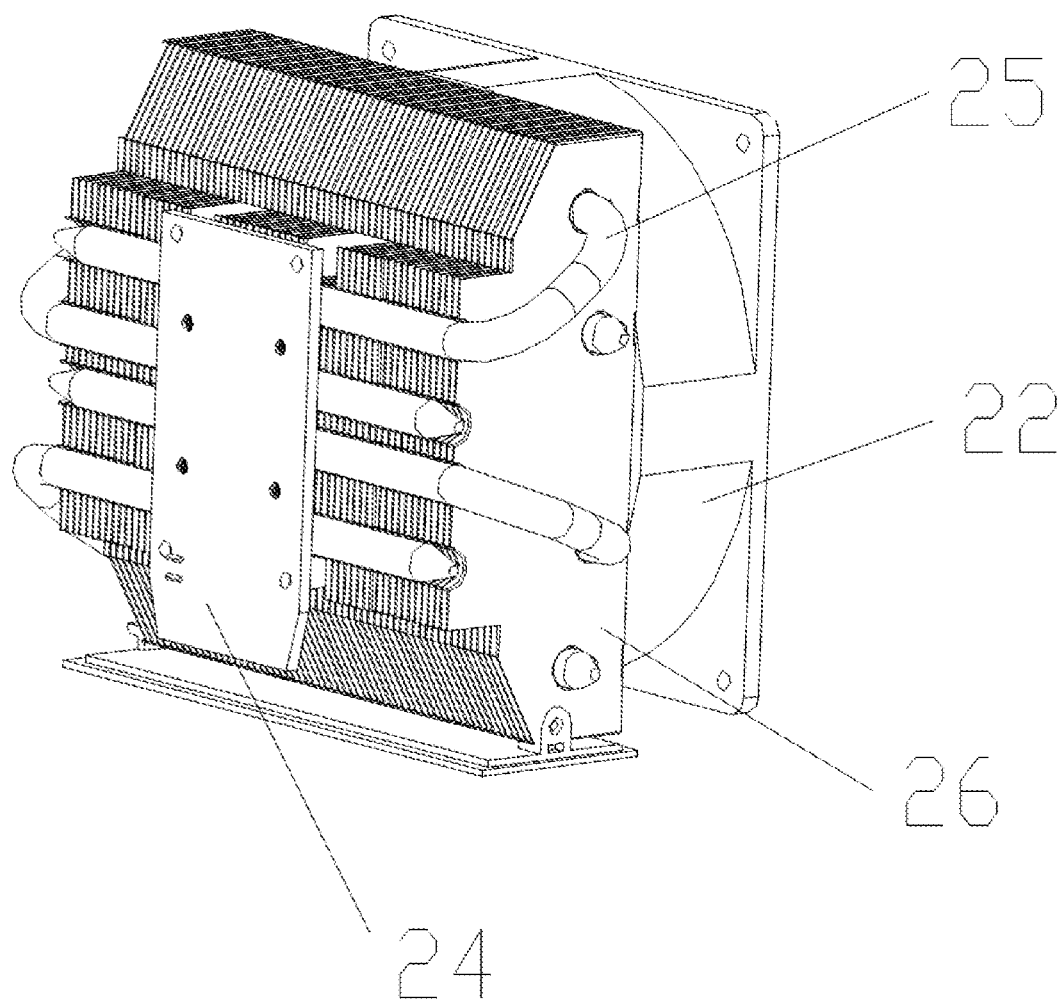
FIG. 6 is a perspective schematic diagram of a first embodiment of a radiator of the optical device of the present disclosure.
Figure 7:
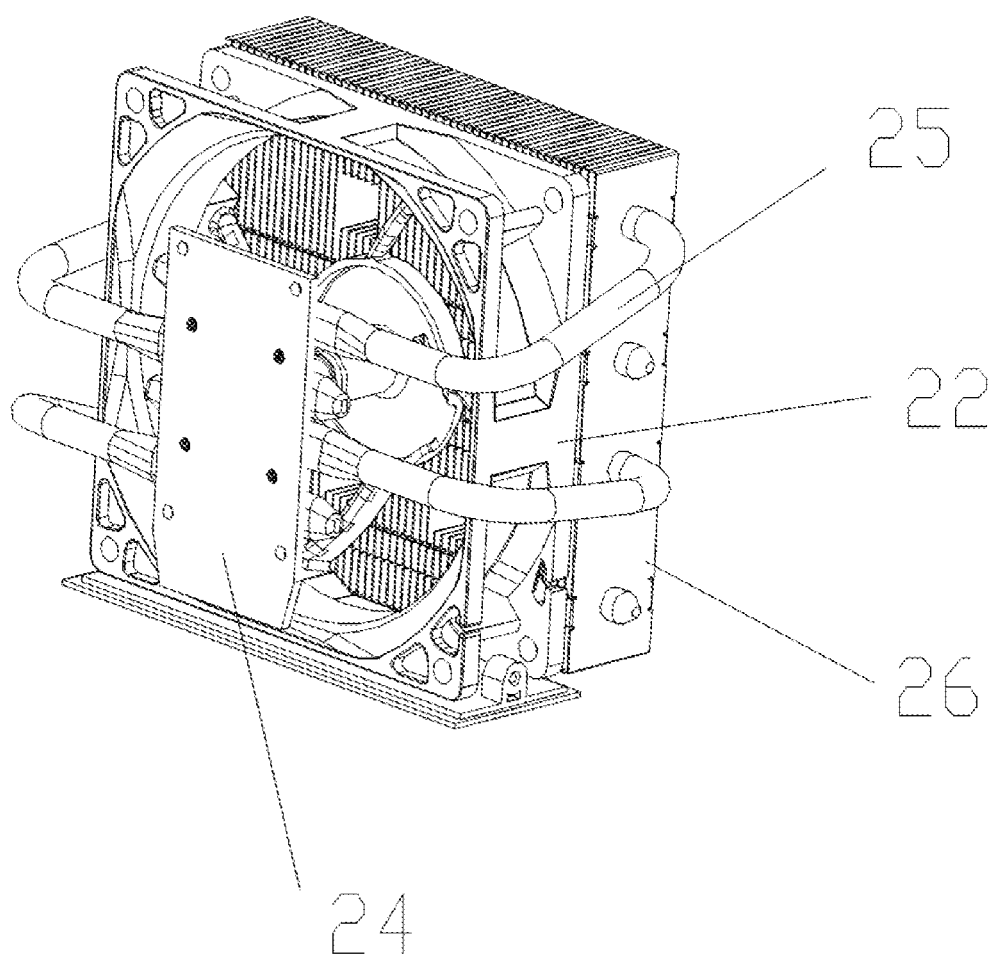
FIG. 7 is a perspective schematic diagram of a second embodiment of the radiator of the optical device of the present disclosure.

As shown in FIGS. 1-7, for convenience of description, the "up", "down", "left", "right", "front", and "rear" orientation references in the present disclosure are based on an orientation shown in FIG. 2.

An optical device with a secondary reflecting structure comprises a housing 1. The housing 1 is sealed. A light source 23, a first reflecting mirror 2, a lens module, a second reflecting mirror 3, and a projection lens 4 are arranged in the housing 1. The first reflecting mirror 2 is adjacent to a left side of the light source 23. The second reflecting mirror 3 is arranged above the first reflecting mirror 2. The projection lens 4 is adjacent to a right side of the second reflecting mirror 3 and is arranged above the light source 23. The lens module is arranged between the first reflecting mirror 2 and the second reflecting mirror 3. Light emitted by the light source 23 is reflected by the first reflecting mirror 2 and passes through the lens module to reach the second reflecting mirror 3, then the light is reflected to the projection lens 4 through the second reflecting mirror 3.

The light source 23 in the present disclosure is an LED circuit board with LED lights.

Optionally, an angle between the light emitted by the light source 23 and a reflective surface of the first reflecting mirror 2 is 45 degrees. An angle between the first reflecting mirror 2 and the second reflecting mirror 3 is 90 degrees. The lens module and the projection lens 4 are horizontally arranged.

Furthermore, a condenser lens 5 is arranged between the light source 23 and the first reflecting mirror 2. The lens module comprises a first lens 6, a reflective polarizer 7, a liquid crystal screen 8, and a second lens 9. The first lens 6, the reflective polarizer 7, the liquid crystal screen 8, and the second lens 9 are sequentially arranged from bottom to top and are arranged parallel to each other.

Through the above-mentioned structural design, the light emitted by the light source 23 is reflected on two sides of the light source 23 by the first reflecting mirror 2 and the second reflecting mirror 3, the optical device of the present disclosure is smaller in size and can make more full use of an interior space of a projector when the optical device is mounted in the projector, which reduces packaging, transportation, and storage costs.

In the embodiment, the housing 1 comprises at least two shells. The at least two shells are connected by buckles. An interior of the housing 1 defines a first cavity 10, a lens module mounting cavity, an image display module mounting cavity, and second cavity 10 sequentially provided from top to bottom.

The second reflecting mirror 3 is arranged on a left end of the first cavity 10. A right end of the first cavity 10 defines a lens mounting opening. The projection lens 4 is connected to the lens mounting opening to seal the lens mounting opening.

The second lens 9 and the liquid crystal screen 8 are arranged inside the lens module mounting cavity from top to bottom.

The reflective polarizer 7 and the first lens 6 are arranged inside the image display module mounting cavity from top to bottom.

A cooling fan 14, the first reflecting mirror 2, the condenser lens 5, and the light source 23 are sequentially arranged inside the second cavity from left to right. A radiator 15 is arranged on a position of an outer side wall of the housing 1 corresponding to the light source 23. A left end of the second cavity 13 defines a first opening. A right end of the lens module mounting cavity and a right end of the image display module mounting cavity separately define a second opening. A left end of the lens module mounting cavity defines a third opening. A first heat dissipating plate 16 is connected to the first opening and the third opening to seal the first opening and the third opening. A second heat dissipating plate 17 is connected to the second opening of the lens module mounting cavity and the second opening of the image display module mounting cavity to seal the second opening of the lens module mounting cavity and the second opening of the image display module mounting cavity.

An air outlet of the cooling fan 14 is communicated with a left end of the image display module mounting cavity. A speaker box 18 is arranged on a position of the outer side wall of the housing 1 corresponding to the second reflecting mirror 3. A mainboard 19 is arranged above the speaker box 18.

Through the above-mentioned structural design, gaps between the cooling fan, the reflective polarizer 7, and the first lens 6, gaps between the second heat dissipating plate 17, the second lens 9, and the liquid crystal screen 8, and the first heat dissipating plate form a circulating heat dissipating channel. Therefore, airflow generated by the cooling fan 14 flows through a gap between the reflective polarizer 7 and the first lens 6, the gaps between the second heat dissipating plate 17, the second lens 9, and the liquid crystal screen 8, the first heat dissipating plate 16 and then flows back to the cooling fan 14, Correspondingly, heat of the second lens 9, the liquid crystal screen 8, the reflective polarizer 7, the first lens 6, and the first reflecting mirror 2 is dissipated by the first heat dissipating plate 16 and the second heat dissipating plate 17, which realizes a purpose of cooling the two lenses 9, the liquid crystal screen 8, the reflective polarizer 7, the first lens 6, and the first reflecting mirror 2.

Furthermore, the radiator 15 is arranged on the position of the outer side wall of the housing 1 corresponding to the light source 23, and the heat generated by the light source 23 is dissipated through the radiator 15. In summary, through the above-mentioned structural design, the heat generated inside the optical device is dissipated in time and to a maximum extent, so as to ensure a long-term and stable operation of the optical device.

In the embodiment, a top portion of the speaker box 18 defines a sound cavity air pipe outlet. The mainboard 19 is arranged above the sound cavity air pipe outlet. A central processing unit (CPU) 20 is arranged on a position of the mainboard 19 corresponding to the sound cavity air pipe outlet. By defining the sound cavity air pipe outlet on the speaker box 18 and by arranging the mainboard 19 above the speaker box 18, the CPU 20 on the mainboard 19 directly faces the sound cavity air pipe outlet. When in use, airflow generated by the speaker box that discharged from the sound cavity air pipe outlet is targeted to dissipate heat generated by the CPU 20 arranged on the mainboard 19. Thus, it is ensured that the CPU 20 does not cause the projector to freeze due to overheating.

In one embodiment, a longitudinal section of the first heat dissipating plate 16 is in a shape of "〖". A right side of the first heat dissipating plate 16 is recessed inward to form a groove. A right end of the first heat dissipating plate 16 is connected with the first opening of the housing 1.

Ribs 21 are arranged at intervals on an outer surface of a front side wall of the first heat dissipating plate 16, an outer surface of a rear side wall of the first heat dissipating plate 16, an outer surface of an upper side wall of the first heat dissipating plate 16, an outer surface of a lower side wall of the first heat dissipating plate 16, an outer surface of the left side wall of the first heat dissipating plate 16, an inner surface of the left side wall of the first heat dissipating plate 16, and an inner surface of the lower side wall of the first heat dissipating plate 16.

Thus, an inner surface of the front side wall of the first heat dissipating plate 16, an inner surface of the rear side wall of the first heat dissipating plate 16, an inner surface of the upper side wall of the first heat dissipating plate 16, the inner surface of the lower side wall of the first heat dissipating plate 16, and the inner surface of the left side wall of the first heat dissipating plate 16 form the heat dissipating channel in the optical device. Correspondingly, the heat in the heat dissipating channel contacts the inner surface of the front side wall of the first heat dissipating plate 16, the inner surface of the rear side wall of the first heat dissipating plate 16, the inner surface of the upper side wall of the first heat dissipating plate 16, the inner surface of the lower side wall of the first heat dissipating plate 16, and the inner surface of the left side wall of the first heat dissipating plate 16. Therefore, the heat in the heat dissipating channel is quickly dissipated by the inner surface of the front side wall of the first heat dissipating plate 16, the inner surface of the rear side wall of the first heat dissipating plate 16, the inner surface of the upper side wall of the first heat dissipating plate 16, the inner surface of the lower side wall of the first heat dissipating plate 16, and the inner surface of the left side wall of the first heat dissipating plate 16.

Moreover, by the ribs arranged on the outer surface of the front side wall of the first heat dissipating plate 16, the ribs arranged on the outer surface of the rear side wall of the first heat dissipating plate 16, the ribs arranged on the outer surface of the upper side wall of the first heat dissipating plate 16, the ribs arranged on the outer surface of the lower side wall of the first heat dissipating plate 16, the ribs arranged on the outer surface of the left side wall of the first heat dissipating plate 16, the ribs arranged on the inner surface of the left side wall of the first heat dissipating plate 16, and the ribs arranged on the inner surface of the lower side wall of the first heat dissipating plate 16, a heat dissipating speed in the heat dissipating channel of the optical device further accelerated.

Optionally, the ribs 21 on the outer surface of the front side wall of the first heat dissipating plate 16, the ribs 21 on the outer surface of the rear side wall of the first heat dissipating plate 16, and the ribs 21 on the outer surface of the left side wall of the first heat dissipating plate 16 are horizontally arranged. The ribs 21 on the outer surface of the upper side wall of the first heat dissipating plate 16 and the ribs 21 on the outer surface of the lower side wall of the first heat dissipating plate 16 are arranged perpendicular to the ribs 21 on the outer surface of the left side wall of the first heat dissipating plate 16. The ribs 21 on the inner surface of the left side wall of the first heat dissipating plate 16 and the ribs 21 on the inner surface of the lower side wall of the first heat dissipating plate 16 are vertically arranged.

Furthermore, the ribs 21 on the outer surface of the front side wall of the first heat dissipating plate 16, the ribs 21 on the outer surface of the rear side wall of the first heat dissipating plate 16, and the ribs 21 on the outer surface of the left side wall of the first heat dissipating plate 16 are arranged in a one-to-one correspondence. The ribs 21 on the outer surface of the left side wall of the first heat dissipating plate 16 connect the ribs 21 on the outer surface of the front side wall of the first heat dissipating plate 16 and the ribs 21 on the outer surface of the rear side wall of the first heat dissipating plate 16. The ribs 21 on the inner surface of the left side wall of the first heat dissipating plate 16 are arranged one-to-one corresponding to the ribs on 21 the inner surface of the lower side wall of the first heat dissipating plate 16. The ribs 21 on the inner surface of the left side wall of the first heat dissipating plate 16 are one-to-one connected to the ribs 21 on the inner surface of the lower side wall of the first heat dissipating plate 16. A distance between each two adjacent ribs 21 of the ribs on the outer surface of the upper side wall of the first heat dissipating plate 16 is equal to a distance between each two adjacent ribs 21 of the ribs 21 on the outer surface of the lower side wall of the first heat dissipating plate 16.

The ribs 21 on the outer surface of the upper side wall of the first heat dissipating plate 16 and the ribs 21 on the outer surface of the lower side wall of the first heat dissipating plate 16 are perpendicular to the ribs 21 on the outer surface of the front side wall of the first heat dissipating plate 16, the ribs 21 on the outer surface of the rear side wall of the first heat dissipating plate 16, and the ribs 21 on the outer surface of the left side wall of the first heat dissipating plate 16. By an arrangement of the ribs, a contact area between the ribs 21 and the heat in the heat dissipating channel of the optical device increases, which further increases the heat dissipating speed.

In the embodiment, the radiator 15 comprises a substrate 24, a radiator fan 22, four radiating pipes 25, and a plurality of cooling fins 26. The plurality of cooling fins 26 is arranged side by side and is arranged at intervals. The substrate 24 is arranged on the position of the outer side wall of the housing corresponding to the light source 23. The radiator fan 22 is stacked on the plurality of cooling fins 26. The radiator fan 22 is arranged on outer sides or inner sides of the plurality of cooling fins 26. A first end of each of the radiating pipes 25 passes through the plurality of cooling fins 26. A second end of each of the radiating pipes 25 is connected to the substrate 24.

Four through holes are on each of the cooling fins 26 from top to bottom. The first end of each of the radiating pipes 25 passes through a corresponding through hole of each of the cooling fins. The second end of each of the radiating pipes 25 is connected to the substrate 24.

Furthermore, a first radiating pipe 25 of each two adjacent radiating pipes of the radiating pipes passes through a corresponding through hole of each of the cooling fins 26 from front to rear. A second radiating pipe 25 of each two adjacent radiating pipes 25 of the radiating pipes 25 passes through a corresponding through hole of each of the cooling fins 26 from rear to front.

By arranging the four radiating pipes 25 symmetrically on the cooling fins 26, not only the number of the radiating pipes is increased, but also a speed of the heat generated by the light source 23 flowing from the substrate 24 to the radiating pipes 25 of the cooling fins 26 is accelerated. Meanwhile, the four radiating pipes 25 are symmetrically arranged on the cooling fins 26, so that heat dissipation effect of the cooling fins 26 is balanced, thus enhancing the heat dissipation effect of the radiator 15. Therefore, the radiator 15 dissipates the excessive heat generated by the light source 23 in time and effectively, which avoids overheating at a position of the light source 23 and avoids affecting stability and safety of the projector.

The present disclosure further provides a projector. The projector comprises a casing and the optical device with the secondary reflecting structure mentioned above. The optical device with the secondary reflecting structure is arranged in the casing to form the projector. The projector provided by the present disclosure has many advantages, such as small size, easy portability, good overall heat dissipation effect during operation, and long-lasting stable operation of the projector. The projector is very suitable for needs of the current market, so it is beneficial for sales staffs to promote the projector and the sales staffs cam obtain good economic benefits.

Technical features of the above-mentioned embodiments can be combined arbitrarily. For the sake of brevity, all possible combinations of the technical features in the above-mentioned embodiments are not described. However, as long as there is no contradiction between the combinations of these technical features, the combinations should be considered to be within the scope of the specification.

The above-mentioned embodiments only represent some embodiments of the present disclosure. The descriptions thereof are specific and detailed, but should not be construed as a limitation of the scope of the present disclosure. It should be pointed out that for those of ordinary skill in the art, without departing from the concept of the present disclosure, modifications and improvements can be made. The modifications and the improvements belong to the protection scope of the present disclosure. Therefore, the protection scope of the present disclosure should be subject to the attached claims.

What is claimed is:

1. An optical device, comprising:
   a housing;
   a light source;
   a first reflecting mirror;
   a lens module;
   a second reflecting mirror; and
   a projection lens;
   wherein the housing is sealed; the light source, the first reflecting mirror, the lens module, the second reflecting mirror, and the projection lens are arranged in the housing; the first reflecting mirror is adjacent to one side of the light source; the second reflecting mirror is arranged above the first reflecting mirror; the projection lens is adjacent to one side of the second reflecting mirror and is arranged above the light source; the lens module is arranged between the first reflecting mirror and the second reflecting mirror; light emitted by the light source is reflected by the first reflecting mirror and passes through the lens module to reach the second reflecting mirror; then the light is reflected to the projection lens through the second reflecting mirror;
   a condenser lens is arranged between the light source and the first reflecting mirror; the lens module comprises a first lens, a reflective polarizer, a liquid crystal screen, and a second lens; the first lens, the reflective polarizer, the liquid crystal screen, and the second lens are sequentially arranged from bottom to top and are arranged parallel to each other;
   wherein the housing comprises at least two shells; the at least two shells are connected by buckles; an interior of the housing defines a first cavity, a lens module mounting cavity, an image display module mounting cavity, and second cavity sequentially provided from top to bottom;
   wherein the second reflecting mirror is arranged on a left end of the first cavity; a right end of the first cavity defines a lens mounting opening; the projection lens is connected to the lens mounting opening to seal the lens mounting opening;
   wherein the second lens and the liquid crystal screen are arranged inside the lens module mounting cavity;
   wherein the reflective polarizer and the first lens are arranged inside the image display module mounting cavity;
   wherein a cooling fan, the first reflecting mirror, the condenser lens, and the light source are sequentially arranged inside the second cavity from left to right a radiator is arranged on a position of an outer side wall of the housing corresponding to the light source; a left end of the second cavity defines a first opening; a right end of the lens module mounting cavity and a right end of the image display module mounting cavity separately define a second opening; a left end of the lens module mounting cavity defines a third opening; a first heat dissipating plate is connected to the first opening and the third opening to seal the first opening and the third opening; a second heat dissipating plate is connected to the second opening of the lens module mounting cavity and the second opening of the image display module mounting cavity to seal the second opening of the lens module mounting cavity and the second opening of the image display module mounting cavity;

wherein an air outlet of the cooling fan is communicated with a left end of the image display module mounting cavity; a speaker box is arranged on a position of the outer side wall of the housing corresponding to the second reflecting mirror; a mainboard is arranged above the speaker box.

2. The optical device according to claim 1, wherein an angle between the light emitted by the light source and a reflective surface of the first reflecting mirror is 45 degrees; an angle between the first reflecting mirror and the second reflecting mirror is 90 degrees; the lens module and the projection lens are horizontally arranged.

3. The optical device according to claim 1, wherein a top portion of the speaker box defines a sound cavity air pipe outlet; the mainboard is arranged above the sound cavity air pipe outlet; a central processing unit (CPU) is arranged on a position of the mainboard corresponding to the sound cavity air pipe outlet.

4. The optical device according to claim 1, wherein a right side of the first heat dissipating plate is recessed inward to form a groove; a right end of the first heat dissipating plate is connected with the first opening of the housing;

wherein ribs are arranged at intervals on an outer surface of a front side wall of the first heat dissipating plate, an outer surface of a rear side wall of the first heat dissipating plate, an outer surface of an upper side wall of the first heat dissipating plate, an outer surface of a lower side wall of the first heat dissipating plate, an outer surface of the left side wall of the first heat dissipating plate, an inner surface of the left side wall of the first heat dissipating plate, and an inner surface of the lower side wall of the first heat dissipating plate.

5. The optical device according to claim 4, wherein the ribs on the outer surface of the front side wall of the first heat dissipating plate, the ribs on the outer surface of the rear side wall of the first heat dissipating plate, and the ribs on the outer surface of the left side wall of the first heat dissipating plate are horizontally arranged; the ribs on the outer surface of the upper side wall of the first heat dissipating plate and the ribs on the outer surface of the lower side wall of the first heat dissipating plate are arranged perpendicular to the ribs on the outer surface of the left side wall of the first heat dissipating plate; the ribs on the inner surface of the left side wall of the first heat dissipating plate and the ribs on the inner surface of the lower side wall of the first heat dissipating plate are vertically arranged;

wherein the ribs on the outer surface of the front side wall of the first heat dissipating plate, the ribs on the outer surface of the rear side wall of the first heat dissipating plate, and the ribs on the outer surface of the left side wall of the first heat dissipating plate are arranged in a one-to-one correspondence; the ribs on the outer surface of the left side wall of the first heat dissipating plate connect the ribs on the outer surface of the front side wall of the first heat dissipating plate and the ribs on the outer surface of the rear side wall of the first heat dissipating plate; the ribs on the inner surface of the left side wall of the first heat dissipating plate are arranged one-to-one corresponding to the ribs on the inner surface of the lower side wall of the first heat dissipating plate; the ribs on the inner surface of the left side wall of the first heat dissipating plate are one-to-one connected to the ribs on the inner surface of the lower side wall of the first heat dissipating plate; a distance between each two adjacent ribs of the ribs on the outer surface of the upper side wall of the first heat dissipating plate is equal to a distance between each two adjacent ribs of the ribs on the outer surface of the lower side wall of the first heat dissipating plate.

6. The optical device according to claim 1, wherein the radiator comprises a substrate, a radiator fan, four radiating pipes, and a plurality of cooling fins; the plurality of cooling fins is arranged side by side and is arranged at intervals; the substrate is arranged on the position of the outer side wall of the housing corresponding to the light source; the radiator fan is stacked on the plurality of cooling fins; the radiator fan is arranged on outer sides or inner sides of the plurality of cooling fins; a first end of each of the radiating pipes passes through the plurality of cooling fins; a second end of each of the radiating pipes is connected to the substrate;

wherein four through holes are on each of the cooling fins from top to bottom; the first end of each of the radiating pipes passes through a corresponding through hole of each of the cooling fins.

7. The optical device according to claim 6, wherein a first radiating pipe of each two adjacent radiating pipes of the radiating pipes passes through a corresponding through hole of each of the cooling fins from front to rear; a second radiating pipe of each two adjacent radiating pipes of the radiating pipes passes through a corresponding through hole of each of the cooling fins from rear to front.

8. A projector, comprising: a casing and the optical device according to claim 1, wherein the optical device is arranged in the casing.

* * * * *